United States Patent
Tanaka et al.

(10) Patent No.: US 11,241,812 B2
(45) Date of Patent: Feb. 8, 2022

(54) INJECTION MOLDING SYSTEM

(71) Applicant: FANUC CORPORATION, Yamanashi (JP)

(72) Inventors: Kazuyoshi Tanaka, Yamanashi (JP); Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 21 days.

(21) Appl. No.: 16/831,180

(22) Filed: Mar. 26, 2020

(65) Prior Publication Data

US 2020/0307054 A1    Oct. 1, 2020

(30) Foreign Application Priority Data

Mar. 28, 2019 (JP) .............................. JP2019-063996

(51) Int. Cl.
   *B29C 45/00* (2006.01)
   *B29C 45/76* (2006.01)
   *B29C 45/78* (2006.01)

(52) U.S. Cl.
   CPC ........ *B29C 45/766* (2013.01); *B29C 45/7626* (2013.01); *B29C 45/78* (2013.01);
   (Continued)

(58) Field of Classification Search
   CPC ....... B29C 45/76; B29C 45/84; B29C 45/766; B29C 45/762
   See application file for complete search history.

(56) References Cited

U.S. PATENT DOCUMENTS 7,539,547 B2 *  5/2009  Stange ............... G05B 19/4185
                                                        700/17
2011/0230995 A1   9/2011  Irwin et al.
(Continued)

FOREIGN PATENT DOCUMENTS

JP    S63-003924 A    1/1988
JP    H06-039889 A    2/1994
(Continued)

OTHER PUBLICATIONS

Notification of Reasons for Refusal dated Jun. 1, 2021 in JP Application No. 2019-063996.

*Primary Examiner* — Joseph S Del Sole
*Assistant Examiner* — Thu Khanh T Nguyen
(74) *Attorney, Agent, or Firm* — Wenderoth, Lind & Ponack, L.L.P.

(57) ABSTRACT

Provided is an injection molding system that uses an identification code, collectively manages the specifications and combinations of an injection molding machine and peripheral devices, and secures a suitable production state for a combination of a wide variety of specifications. An injection molding system include: an injection molding machine; a plurality of peripheral devices; an identification code attached to the injection molding machine and each of the plurality of peripheral devices, and having identification information of the injection molding machine and each of the plurality of peripheral devices; a code reader that reads the identification code; and a management unit including a storage unit that stores a correct combination of the identification code of the injection molding machine and the plurality of peripheral devices, and a confirmation determination unit for confirming whether the correct combination stored in the storage unit matches the identification code read by the code reader.

8 Claims, 11 Drawing Sheets

(52) U.S. Cl.
CPC .............. *B29C 2945/76531* (2013.01); *B29C 2945/76939* (2013.01)

(56) References Cited

U.S. PATENT DOCUMENTS

| | | | |
|---|---|---|---|
| 2017/0334113 A1* | 11/2017 | Uchiyama | ................ B29C 45/76 |
| 2018/0065286 A1 | 3/2018 | Pruitt et al. | |
| 2018/0147765 A1* | 5/2018 | Nanri | .................. B29C 45/7653 |
| 2018/0178452 A1* | 6/2018 | Costabeber | ........... B29C 64/259 |
| 2018/0311878 A1* | 11/2018 | Grimm | ................. B29C 45/768 |

FOREIGN PATENT DOCUMENTS

| JP | 2016-137601 A | 8/2016 |
|---|---|---|
| JP | 2016-185694 A | 10/2016 |
| JP | 2016-203484 A | 12/2016 |

* cited by examiner

FIG. 3

| NO. | ITEM | IDENTIFICATION CODE | CONFIRMATION | CONFIRMATION STATUS |
|---|---|---|---|---|
| 1 | MOLDING MACHINE SPECIFICATION | 567890 | VALID | CONFIRMED |
| 2 | MOLD | 123456 | VALID | CONFIRMED |
| 3 | RESIN | 789012 | VALID | NOT CONFIRMED YET |
| 4 | MOLD TEMPERATURE CONTROLLER | 345678 | INVALID | — |
| 5 | PICKER HAND | 901234 | INVALID | — |

FIG. 7

| NO. | ITEM | IDENTIFICATION CODE | CONFIRMATION | CONFIRMATION STATUS |
|---|---|---|---|---|
| 1 | MOLDING MACHINE SPECIFICATION | 567890 | VALID | CONFIRMED |
| 2 | MOLD | 123456 | VALID | CONFIRMED |
| 3 | RESIN | 789012 | VALID | NOT CONFIRMED YET |

INJECTION MOLDING SYSTEM

This application is based on and claims the benefit of priority from Japanese Patent Application No. 2019-063996, filed on 28 Mar. 2019, the content of which is incorporated herein by reference.

BACKGROUND OF THE INVENTION

Field of the Invention

The present invention relates to an injection molding system.

Related Art

Injection molding machines include a clamping unit that moves a moving platen with respect to a stationary platen, opens and closes a mold, and performs clamping, and an injection unit that is provided to be relatively movable with respect to the stationary platen by a feed mechanism, and injects a molding material such as molten resin into a cavity of a pair of molds clamped.

Furthermore, a system has been put into practical use which performs injection molding by automatic operation in which an injection molding machine is controlled to be actuated with peripheral devices such as a temperature controller, a resin feeder, a picker (a robot) for taking out and conveying a molded article, and the like, in a predetermined order.

For example, Japanese Unexamined Patent Application, Publication No. 2006-150837 discloses "a management device of an injection molding machine for managing a part or all of a series of processes upon producing a molded article by the injection molding machine, wherein an apparatus main body portion of a read-write apparatus for reading and/or writing data by non-contact with an IC tag is provided in a molding machine controller mounted in the injection molding machine, and an antenna portion connected to the apparatus main body portion is disposed at a predetermined site of the injection molding machine, and an IC tag is provided to each one or two or more production-related articles used in producing the molded article".

Patent Document 1: Japanese Unexamined Patent Application, Publication No. 2006-150837

SUMMARY OF THE INVENTION

Furthermore, the injection molding machine is configured according to various specifications and by combining the apparatuses as described above, and moreover, for example, the screw and barrel of the injection device are often configured so as to exchange between a plurality of specifications with the same machine, thereby handling the material to be used or the like.

When controlling an injection molding system including an injection molding device configured in such a wide variety of specifications and the combination of the devices, and a wide variety of peripheral devices, it is difficult to easily confirm the combinations. Therefore, there is a risk of production defects due to operation errors, causing damage to the equipment or the like.

Therefore, a technique of establishing a system that can confirm various specifications and combinations to suitably control them so as to prevent production defects, damage to equipment, etc. has been strongly desired.

It should be noted that the management device of the injection molding machine of Japanese Unexamined Patent Application, Publication No. 2006-150837 is intended to manage the peripheral devices in accordance with a series of processes. Therefore, it is not possible for the screw and barrel of the injection molding machine to handle a wide variety of devices such as molds, changes in specifications or the like.

According to an aspect of the present disclosure, an injection molding system includes: an injection molding machine; a plurality of peripheral devices; an identification code attached to the injection molding machine and each of the plurality of peripheral devices, and having identification information of the injection molding machine and each of the plurality of peripheral devices; a code reader that reads the identification code; and a management unit including a storage unit that stores a correct combination of the identification code of the injection molding machine and the plurality of peripheral devices, and a confirmation determination unit for confirming whether the correct combination stored in the storage unit matches the identification code read by the code reader.

According to the injection molding system of an aspect of the present disclosure, it is possible to easily confirm various specifications and combinations of an injection molding system including an injection molding machine configured with a wide variety of specifications and combinations of devices and a wide variety of peripheral devices, and suitably control them, whereby it is possible to suitably prevent the occurrence of production defects, damage to equipment, or the like. In other words, it becomes possible to realize and provide a highly reliable and productive injection molding system.

BRIEF DESCRIPTION OF THE DRAWINGS

FIG. 3 is a diagram illustrating an example of a list shown by an injection molding system of an embodiment;

FIG. 7 is a diagram showing an example of a list shown by an injection molding system of an embodiment;

DETAILED DESCRIPTION OF THE INVENTION

Hereinafter, a description will be given of an injection molding system according to an embodiment with reference to FIGS. 1 to 12.

Herein, the present embodiment relates to an injection molding system for using, for example, a QR code (registered trademark), a bar code, or an identification code such as an RFID tag (identification information), collectively managing the specifications and combinations of the injection molding machine and peripheral devices, and securing a suitable production state for a combination of a wide variety of specifications.

Figure 1:
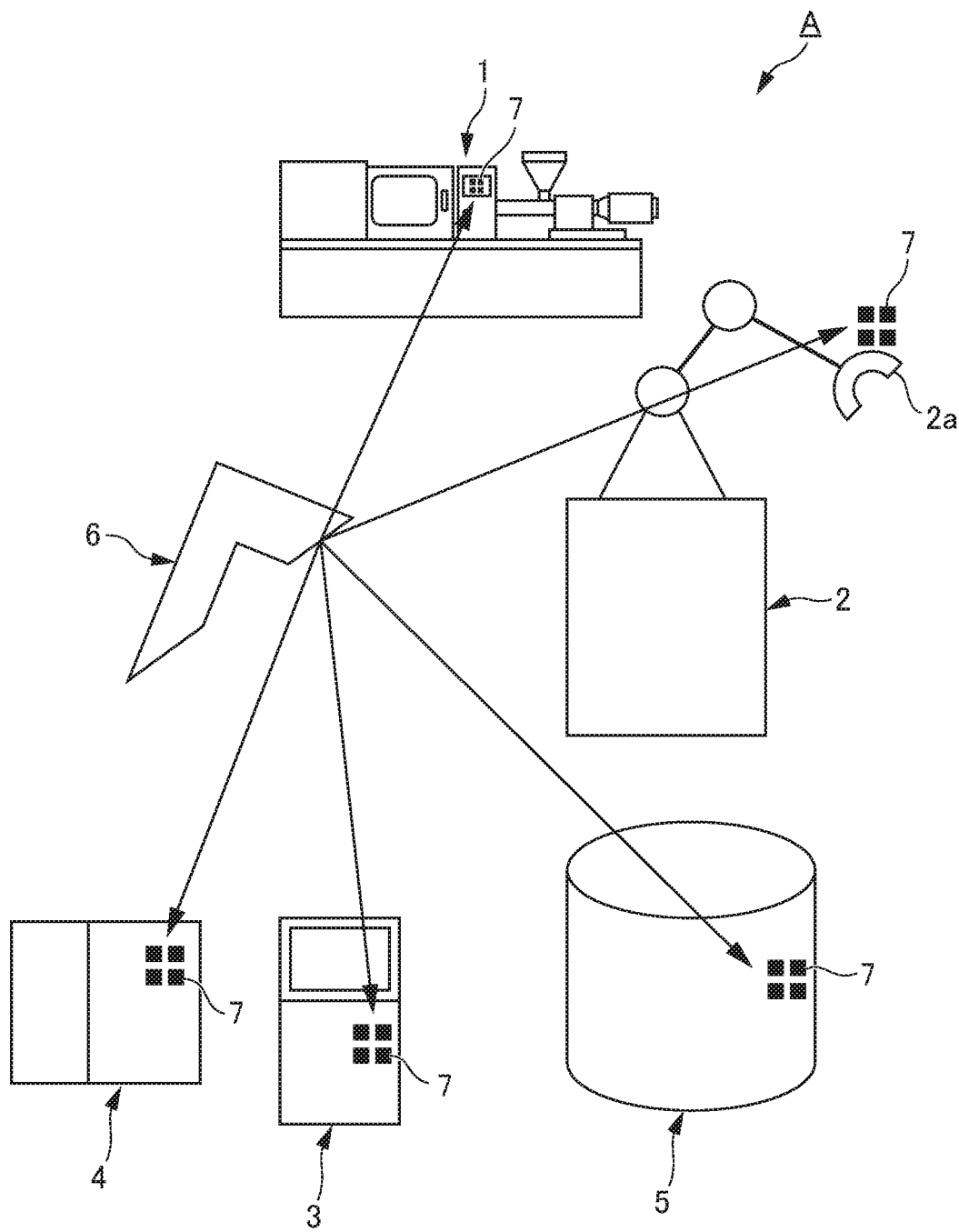
FIG. 1 is a diagram showing an injection molding system of an embodiment.

More specifically, as shown in FIG. 1, an injection molding system A of the present embodiment includes, for example, a well-known injection molding machine 1 having a mold, an injection device, and the like, a picker 2 (robot) for taking out and conveying a molded article from the injection molding machine 1, a temperature controller 3, a mold 4 (mold management device), a resin feeder 5 (material feeder), and a code reader 6 for reading an identification code.

An identification code 7 is attached to the apparatus/device itself of a hand 2a of the picker 2, the temperature controller 3, the mold 4, and the resin feeder 5 as peripheral devices.

On the other hand, in the present embodiment, the specification changes variously by replacing, for example, a screw and/or barrel in the same injection device, or changes variously depending on a material to be used, etc., the identification code 7 indicating identification information of not only the specification of the molding machine main body, but also the specification of a structural form thereof at the point in time is attached not only to the peripheral devices, but also to the injection molding machine 1.

Figure 2:
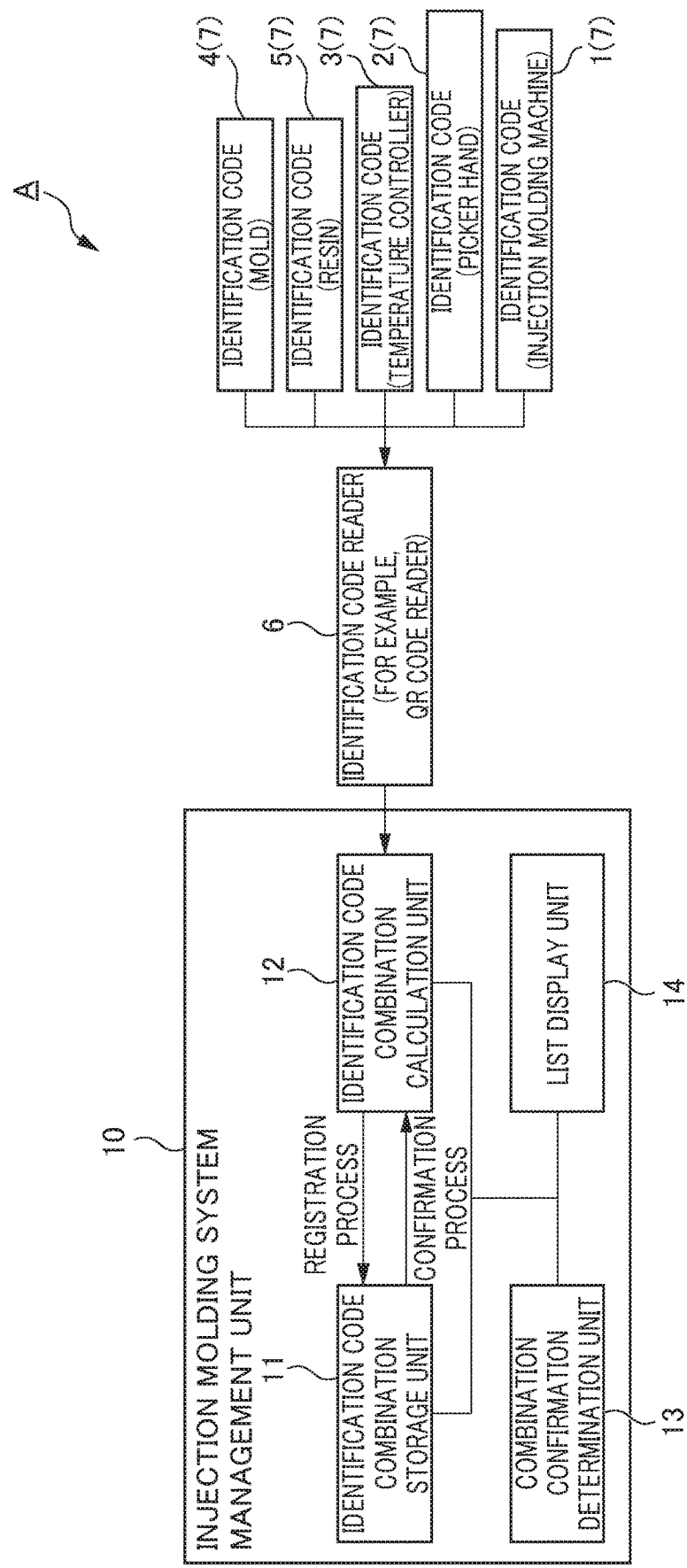
FIG. 2 is a block diagram showing an injection molding system of an embodiment.

In the injection molding system A of the present embodiment, as shown in FIG. 2, a management unit 10 (injection molding system management unit) is provided.

The management unit 10 includes a storage unit 11 (identification code combination storage unit) for storing the correct combination list of the identification code (for example, a list 8 as shown in FIG. 3), a calculation unit 12 (identification code combination calculation unit) for compressing the combination data of the identification code and storing the data in the storage unit 11, a confirmation determination unit 13 (combination confirmation determination unit) for confirming whether the combination stored in the storage unit 11 and the identification code sent by being read by the code reader 6 match, and a list display unit 14 showing a determination result by the confirmation determination unit 13.

Furthermore, the management unit 10 includes a mold file calling section for calling a corresponding mold file when the identification code of the mold is read by the code reader 6.

In addition, the storage unit 11 stores a mold file that contains the correct combination of identifying codes.

Furthermore, the confirmation determination unit 13 prohibits the automatic operation until the confirmation status is reset when a mold file is called, and the confirmation of the correct combination is completed.

Figure 4:
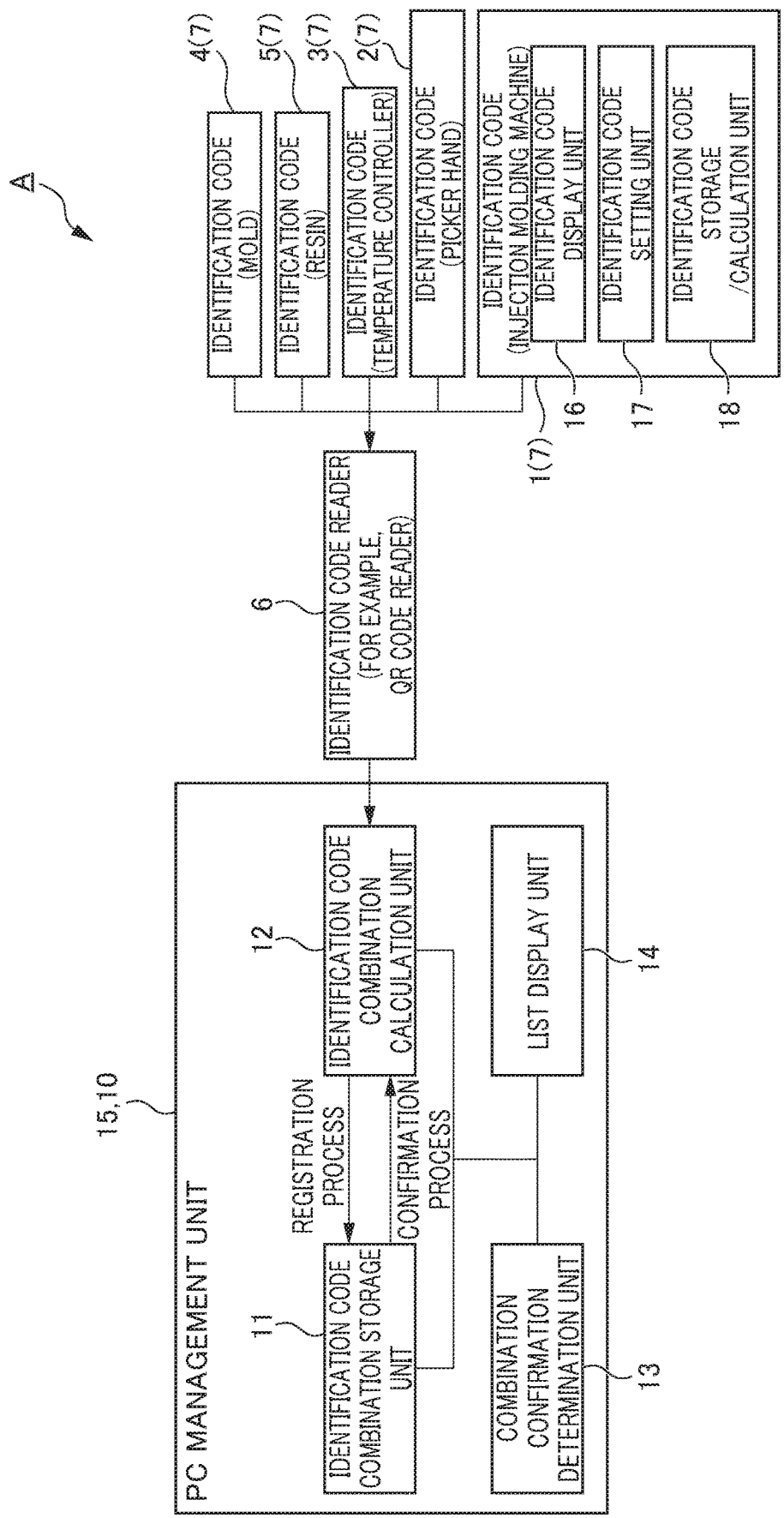
FIG. 4 is a block diagram showing an injection molding system of an embodiment, and showing a case in which a PC is provided with a management unit.

Here, in the injection molding system A of the present embodiment, as shown in FIG. 4, the management unit 10 may be configured by a PC 15 (personal computer).

Figure 5:
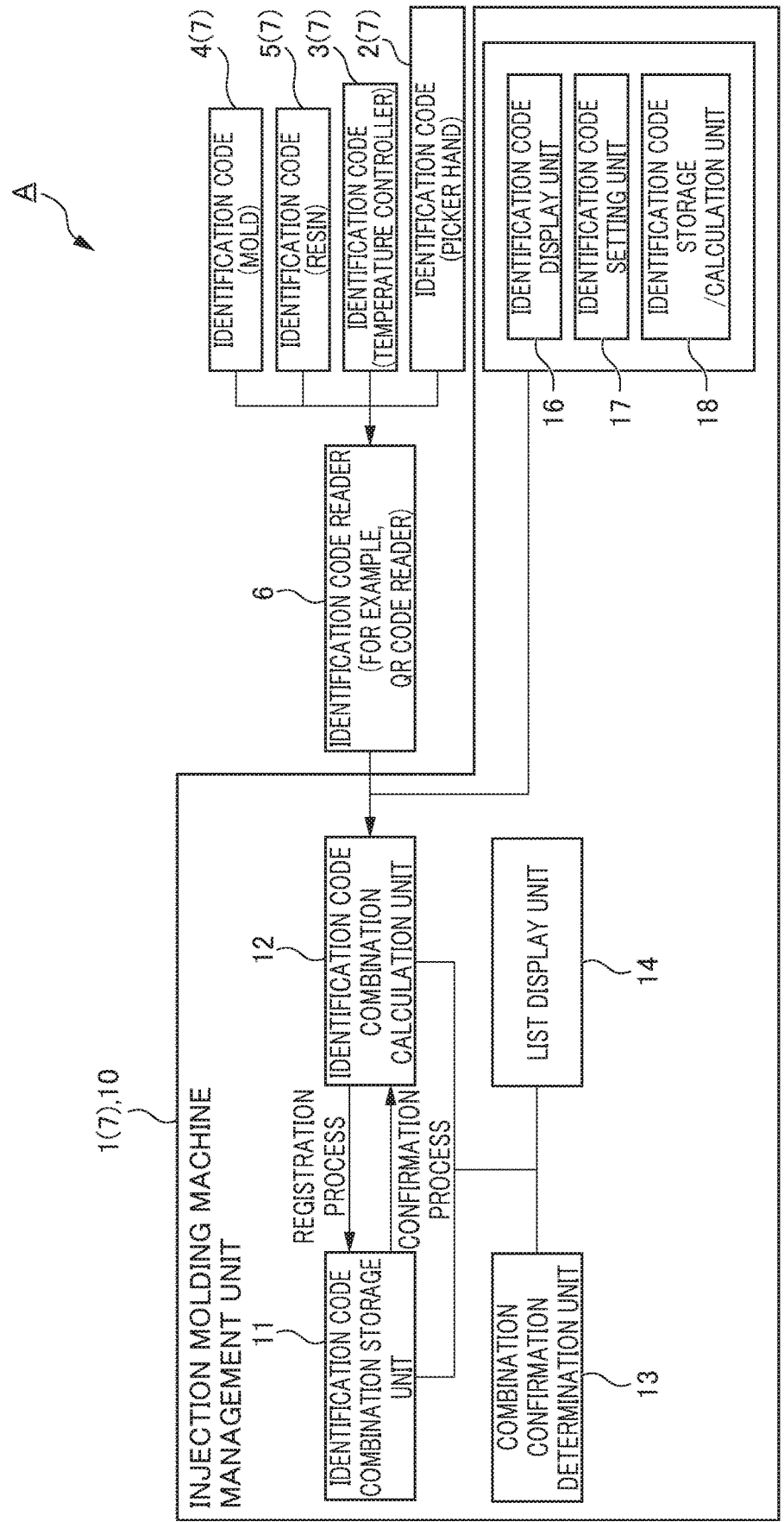
FIG. 5 is a block diagram showing an injection molding system of an embodiment, and showing a case in which an injection molding machine is provided with a management unit.

Furthermore, in the injection molding system A of the present embodiment, as shown in FIG. 5, the injection molding machine 1 itself may be provided with the management unit 10.

Furthermore, as shown in FIGS. 4 and 5, the injection molding machine may be provided with an identification code display unit 16, an identification code setting unit 17, and an identification code storage/calculation unit 18 (identification code storage unit) of the injection molding machine for displaying the specification of at the point in time, the structural form, or the like, such as the specifications of the screw and barrel of an injection device, and for setting and storing (calculating) the various kinds of specifications, structural forms, etc. Furthermore, the identification code display unit 16 may also be used as a list display unit 14.

Figure 6:
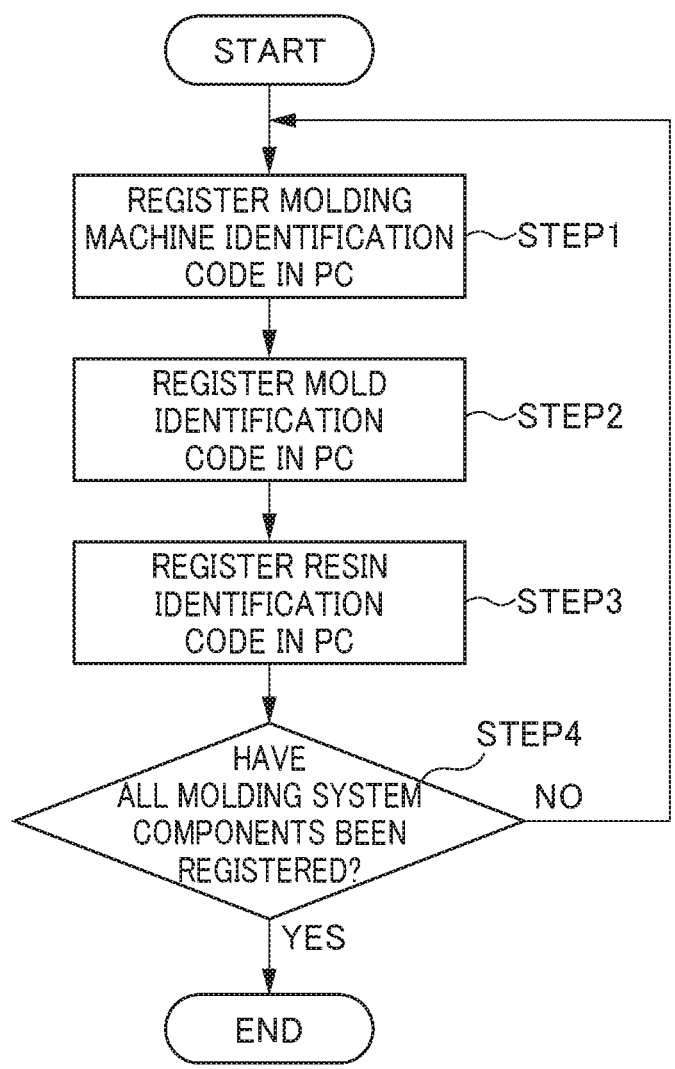
FIG. 6 is a flowchart showing an example of a registration process of registering an identification code of an injection molding machine and various peripheral devices using an injection molding system of an embodiment, and showing a case in which a PC is provided with a management unit.

Thereafter, in a case in which the management unit 10 is configured by the PC 15 as shown in FIG. 4, the registration process is performed by storage unit 11 and the calculation unit 12 as shown in FIG. 4 and FIG. 6. It should be noted that, in the present embodiment, as shown in the list 8 of FIG. 7 (refer to FIG. 3), a description will be given on the assumption that the registration of the specifications of the injection molding machine 1, the mold 4, and the resin 5 are required, and the registration and confirmation of the temperature controller 3 and the picker 2 are not performed.

As shown in FIG. 6, in the registration process by the storage unit 11 and the calculation unit 12 of the management unit 10 of the PC 15, first, the registration of the identification code 7 of the injection molding machine 1, the identification code 7 of the mold 4, and the identification code 7 of the resin 5 to the PC 15 is sequentially performed (Step 1, Step 2, and Step 3), and it is confirmed whether the registration of all of the molding system components is completed (Step 4).

Figure 8:
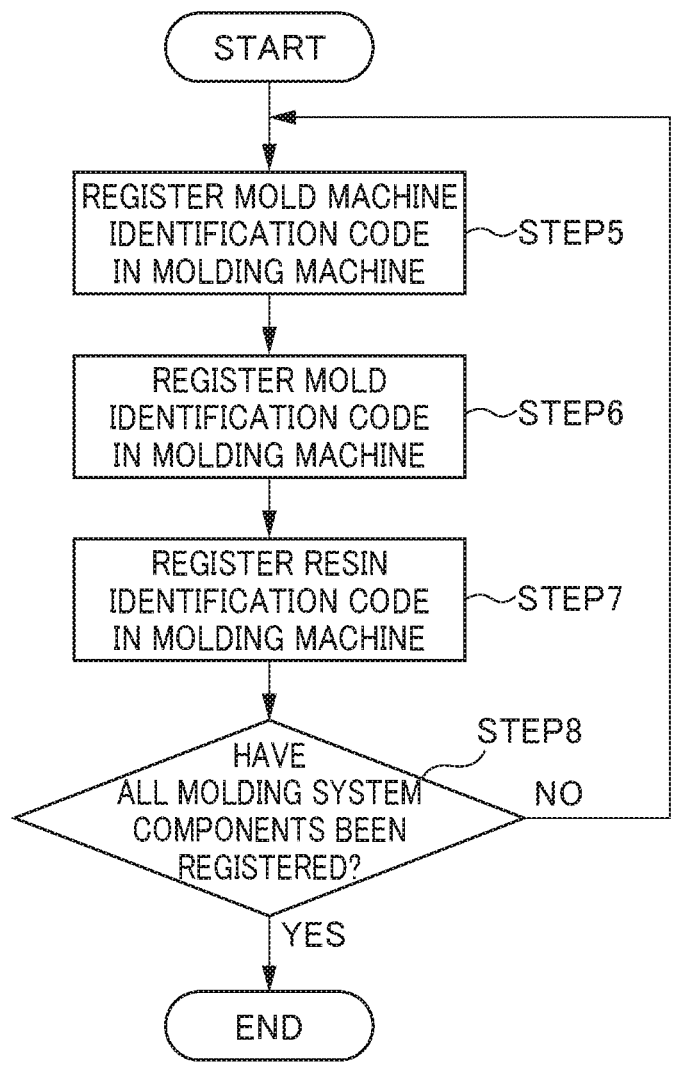
FIG. 8 is a flowchart showing an example of a registration process of registering an identification code of an injection molding machine and various peripheral devices using an injection molding system of an embodiment, and showing a case in which an injection molding machine is provided with a management unit.

On the other hand, in the registration process in a case in which the injection molding machine 1 itself is provided with the management unit 10 as shown in FIG. 5, the injection molding system A operates as shown in FIG. 8, and in the management unit 10 of the injection molding machine 1, the registration of the identification code 7 of the injection molding machine 1, the identification code 7 of the mold 4, the registration of the identification code 7 of the resin 5 is sequentially performed (Step 5, Step 6, Step 7), and it is confirmed whether the registration of all of the molding system components is completed (Step 8).

In this way, the calculation unit 12 performs a combination calculation of the identification code on the basis of the information sent from the code reader 6, the result is stored in the storage unit 11, and the registration process is performed.

Figure 9:
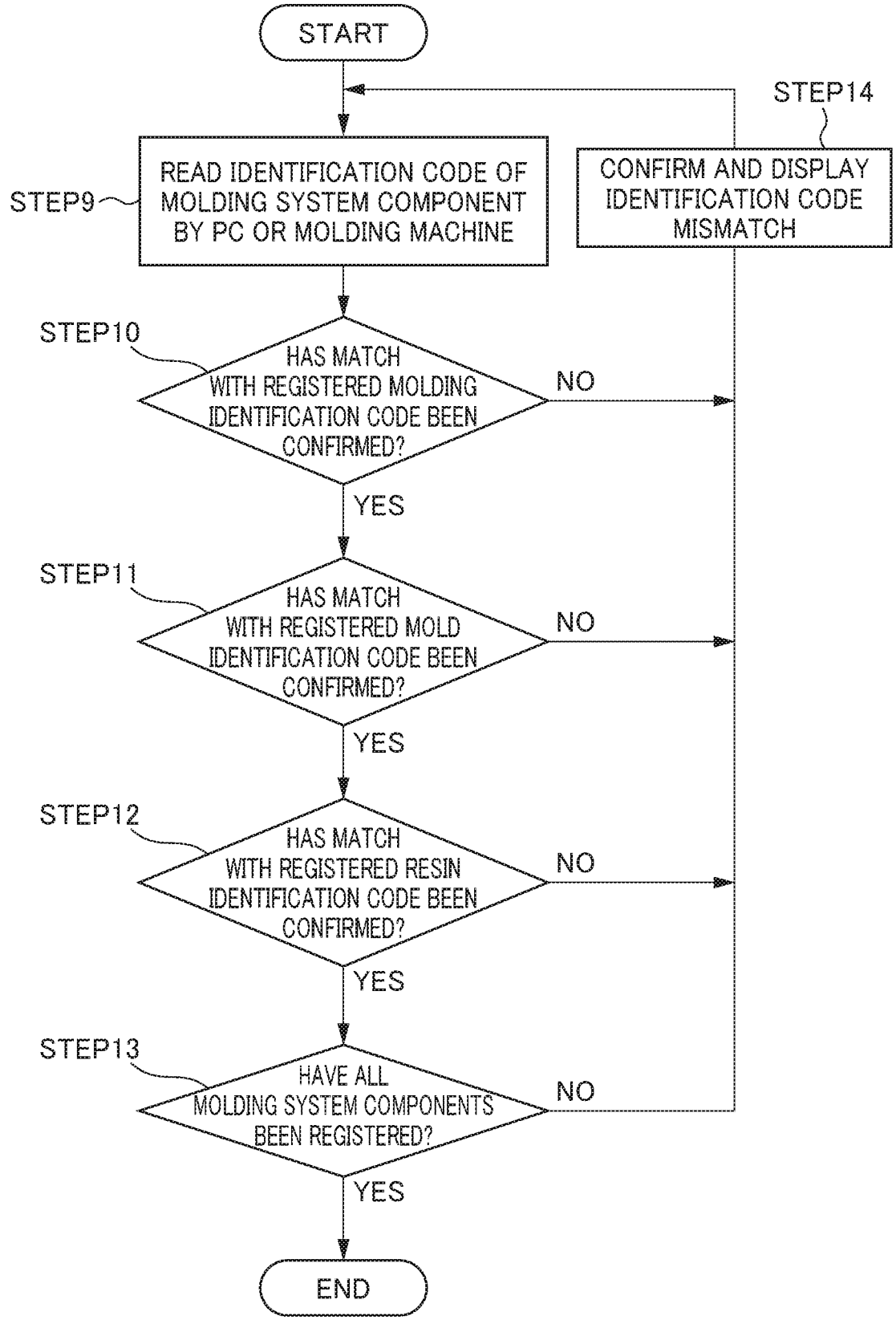
FIG. 9 is a flowchart showing an example of a confirmation process of confirming an identification code of an injection molding machine and various peripheral devices using an injection molding system of an embodiment.

Next, after the registration is completed at the control unit 10 of the PC 15 or at the control unit 10 of the injection molding machine 1, as shown in FIG. 9 (FIG. 4 and FIG. 5), the confirmation process of the combination is performed by the confirmation unit 13.

In this confirmation process, the identification code of the molding system component is read (Step 9) by the PC 15 or the injection molding machine 1, and it is confirmed whether or not the identification code thus read matches the respective identification codes 7 of the injection molding machine 1, the mold 4, and the resin 5 that are registered (Step 10, Step 11, Step 12, and Step 13).

In each confirmation process, in a case in which the registered identification code 7 and the read identification code 7 do not match, for example, the list display unit 14 displays the state of discrepancy (Step 14), thereby allowing an operator or the like to recognize such a status.

In a case in which, in each confirmation process, it is confirmed that the registered identification codes 7 and the read identification codes match for all of the molding system components (Step 13), the confirmation process is completed and the list display unit 14 displays a complete match.

Figure 10:
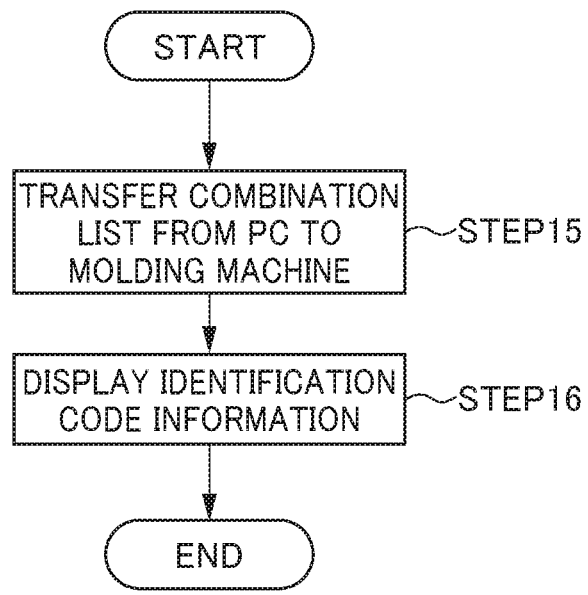
FIG. 10 is a flowchart showing processing of transferring a combination list to an injection molding machine from a PC in an injection molding system of an embodiment.

Here, as shown in FIG. 10, after the registration process and the confirmation process are performed by the management unit 10 of the PC 15, it may be configured to transfer the combination list 8 to the injection molding machine 1 (Step 15) to display the identification code information (Step 16).

Figure 11:
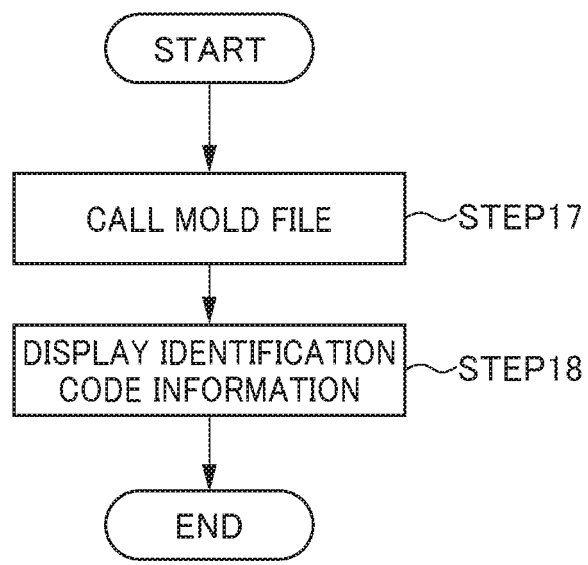
FIG. 11 is a flowchart showing processing of calling a mold file and displaying identification code information in an injection molding system of an embodiment.

Furthermore, in a case in which the combination of mold files, i.e., the combination of molding conditions for each mold, is stored in the storage unit 11 (or identification code storage/calculation unit 18, or a storage unit provided separately in the mold 4), as shown in FIG. 11, the PC 15 or the management unit 10 of the injection molding machine 1 calls the mold file (Step 17) to display the identification code information (Step 18). Thereafter, the registration process and the confirmation process are performed for the identification code 7 of the mold 4 corresponding to the molding conditions.

Figure 12:
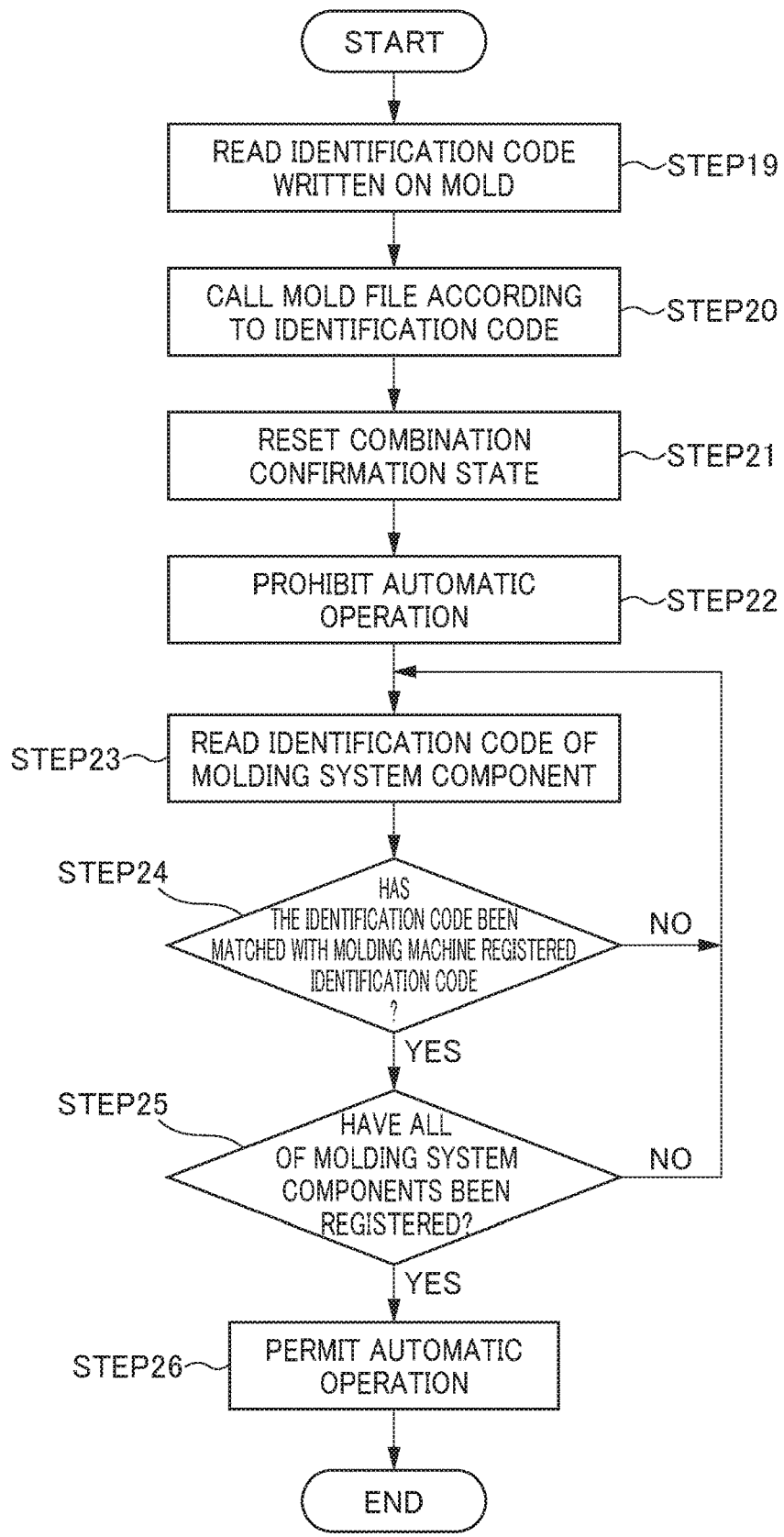
FIG. 12 is a flowchart showing an example of processing of automatically operating an injection molding machine using an injection molding system of an embodiment.

Furthermore, in a case in which the automatic operation is performed after the confirmation process is completed, for example, as shown in FIG. 12, the identification code 7 of the mold 4 is read (Step 19), the mold file is called according to the identification code 7 (Step 20), and the combination confirmation status is reset (Step 21). It should be noted that Step 19 and Step 20 are operations performed after the manufacturing process of the previous molded article and when the manufacturing process of the next molded article is started. That is, the operation is necessary when changing the information of the mold 4 used in the previous manufacturing process to the information of the mold 4 used in the next manufacturing process.

Thereafter, after resetting the combination confirmation status (Step 21), control to prohibit the automatic operation is performed once (Step 22).

In this automatic operation prohibition control state, as described above, the identification code 7 of the molding system component is read (Step 23), whether or not the identification code matches the identification code 7 of the molding machine registration is confirmed (Step 24), the confirmation of the match of the identification code 7 of all of the molding system components is completed (Step 25), and the permission control of the automatic operation is performed (Step 26).

Some peripheral devices may be connected to the injection molding machine 1 by I/O, Ethernet (registered trademark), or the like, and may operate by the screen setting of the injection molding machine 1. In such a case, the correct state of the screen setting of the injection molding machine 1 in addition to the identification code 7 may be included in the combination list 8.

In addition, depending on the peripheral devices, a problem may occur by manually operating such as the mold opening and closing or the screw operation of the injection device. For example, there is a case where an inconvenience occurs by manually performing the mold opening or purge (resin discharge) in a state of not being controlled by the mold temperature controller.

Therefore, not only the automatic operation, the operation of the injection molding machine 1 to limit for each identification code 7 or screen setting is included in the combination list 8 of the identification code 7, and the operation corresponding to an unidentified identification code 7 may be limited.

In a case in which the identification code 7 is a two-dimensional code such as a QR code (registered trademark), it is possible to express not only numbers, but also alphanumeric characters or kanji (Chinese characters). The identification code 7 is set as a necessary check item for each injection molding system A, and it is possible to prevent operation omission by an operator by displaying the item on the screen of the injection molding machine 1.

For example, in a case of using the mold temperature controller, it is necessary to connect a hose for flowing a medium to the mold. In such a case, the identification code 7 is set to "connect the temperature control hose to the mold", and the QR code (registered trademark) is attached to the hose connection portion of the mold. Since the QR code (registered trademark) is read by the code reader 6, the operator is supposed to always confirm the hose connection. It is possible to confirm whether any operation is omitted or not by the identification code 7 on the screen. By leaving the reading result of these identification codes 7 in the management unit 10 of the injection molding system A, it is also possible to review later whether the confirmation is performed.

Conventionally, in a case of adding a check item as described above, whether it has been confirmed or not is uncertain based on the confirmation button on the screen. In addition, when such a confirmation button or the like is installed near the workplace, it has taken a lot of time and effort to add confirmation items.

Therefore, according to the injection molding system A of the present embodiment, it is possible to easily confirm various specifications and combinations of the injection molding system A including an injection molding machine 1 configured with a wide variety of specifications and combinations of devices and a wide variety of peripheral devices, and suitably control them, whereby it is possible to suitably prevent the occurrence of production defects, damage to equipment, or the like. In other words, it becomes possible to realize and provide a highly reliable and productive injection molding system A.

Although an embodiment of the injection molding system has been described, the present invention is not limited to the one embodiment described above, and it can be modified appropriately to the extent that does not deviate from the spirit thereof.

EXPLANATION OF REFERENCE NUMERALS 1 injection molding machine
2 picker (robot: peripheral device)
3 temperature controller (peripheral device)
4 mold (mold management device)
5 resin feeder (material feeder)
6 code reader
7 identification code
8 list
10 management unit (injection molding system management unit)

11 storage unit (identification code combination storage unit)
12 calculation unit (identification code combination calculation unit)
13 confirmation determination unit (combination confirmation determination unit)
14 list display unit
15 PC
16 identification codes display unit
17 identification code setting unit
18 identification code storage/calculation unit (identification code storage unit)
A injection molding system

What is claimed is:

1. An injection molding system comprising:
   an injection molding machine;
   a plurality of peripheral devices with which the injection molding machine is controlled to be actuated;
   an identification code attached to the injection molding machine and each of the plurality of peripheral devices, and having identification information of the injection molding machine and each of the plurality of peripheral devices;
   a code reader that reads the identification code; and
   a management unit including
   a storage unit that stores a correct combination of the identification code of the injection molding machine and the plurality of peripheral devices, and
   a confirmation determination unit for confirming whether the correct combination stored in the storage unit matches the identification code read by the code reader.

2. The injection molding system according to claim 1, wherein the management unit further includes a list display unit that indicates a determination result by the confirmation determination unit.

3. The injection molding system according to claim 1, wherein the plurality of peripheral devices at least includes
   a picker that takes out a molded article from the injection molding machine,
   a temperature controller,
   a mold, and
   a material feeder for supplying an injection material to the injection molding machine.

4. The injection molding system according to claim 1, wherein a personal computer is provided with the management unit.

5. The injection molding system according to claim 1, wherein the injection molding machine is provided with the management unit.

6. The injection molding system according to claim 1, wherein the injection molding machine further includes:
   an identification code display unit that displays a specification of the identification code at a point in time of the injection molding machine,
   an identification code setting unit that sets a specification of the injection molding machine indicated by the identification code, and
   an identification code storage unit that stores the identification code indicating the specification of the injection molding machine that is set by the identification code setting unit.

7. The injection molding system according claim 1, further comprising a mold file calling section for calling a corresponding mold file when the identification code of the mold is read by the code reader.

8. The injection molding system according to claim 1, further comprising:
   an identification mode combination storage unit including a correct combination of the identification code in the mold file; and
   the confirmation determination unit that prohibits automatic operation until a confirmation status is reset when the mold file is called, and a confirmation of a correct combination is completed.

* * * * *